US006334538B1

United States Patent
Nettles

(10) Patent No.: US 6,334,538 B1
(45) Date of Patent: Jan. 1, 2002

(54) STALL CLEANER

(76) Inventor: L. Ronnie Nettles, Rte. 1, Box 224, Madisonville, TX (US) 77864

( * ) Notice: Subject to any disclaimer, the term of this patent is extended or adjusted under 35 U.S.C. 154(b) by 0 days.

(21) Appl. No.: 09/443,722

(22) Filed: Nov. 19, 1999

Related U.S. Application Data
(60) Provisional application No. 60/111,039, filed on Nov. 25, 1998.

(51) Int. Cl.[7] .................................................. B07B 1/40
(52) U.S. Cl. ....................... 209/418; 209/419; 209/417; 209/421; 209/420
(58) Field of Search ................................. 209/325, 677, 209/341, 367, 420, 421, 417, 418, 419, 311, 313

(56) References Cited

U.S. PATENT DOCUMENTS

| | | |
|---|---|---|
| 1,773,405 A | 8/1930 | Overstrom |
| 2,010,858 A | 8/1935 | Hazle, Jr. |
| 2,453,883 A | 11/1948 | Wettlaufer |
| 2,828,014 A | 3/1958 | Wantling |
| 2,983,381 A | 5/1961 | Ball |
| 3,123,552 A | 3/1964 | Lowry |
| 3,307,698 A | 3/1967 | Haffner |
| 3,468,418 A | 9/1969 | Renner |
| 4,274,953 A | 6/1981 | Jackson |
| 4,698,150 A * | 10/1987 | Wigoda |
| 5,160,034 A * | 11/1992 | Potter .......................... 209/38 |
| 5,265,730 A | 11/1993 | Norris et al. |
| 5,305,891 A | 4/1994 | Bielagus |
| 5,794,787 A | 8/1998 | Johnston |
| 5,848,697 A | 12/1998 | Eash |
| 5,927,513 A | 7/1999 | Hart ..................................... |

* cited by examiner

*Primary Examiner*—Donald P. Walsh
*Assistant Examiner*—Jonathan R Miller
(74) *Attorney, Agent, or Firm*—Bracewell & Patterson, L.L.P.

(57) ABSTRACT

A stall cleaner that scoops material, such as a mixture of wood shavings and animal manure, sifts selected material out of the scooped material and collects remaining material in a receptacle. The cleaner includes a stationary portion and a vibrating portion. The stationary portion includes a frame that is supported by wheels. A scoop is located at a front end of the frame. A handle is provided on a rear end of the frame. The vibrating portion of the apparatus includes a tray that is supported by the frame. The tray has a rigid perimeter that surrounds and supports a plurality of spaced longitudinal elements. A motor rotates an off-center weight to impart vibration to the tray, causing smaller particles to fall through the tray. A receptacle is located behind the frame on the apparatus. The receptacle is positioned such that materials slide off of the rear end of the tray into the receptacle.

19 Claims, 3 Drawing Sheets

STALL CLEANER

CROSS-REFERENCE TO RELATED APPLICATIONS

This application claims the benefit of provisional application Ser. No. 60/111,093, filed on Nov. 25, 1998, in the United States Patent & Trademark Office.

TECHNICAL FIELD

The present invention relates to an apparatus for collecting and sifting material. More particularly, the apparatus of the invention relates to an apparatus that may be used to scoop soiled wood shavings and manure from an animal stall, sift out unsoiled wood shavings for reuse and collect soiled wood shavings and manure in a receptacle for disposal.

BACKGROUND ART

Wood shavings are often used as bedding materials in animal stalls, such as horse stalls. The wood shavings typically completely cover a floor of the stall. Since an animal is kept within the stall for long periods of time, some of the wood shavings become soiled by animal urine and manure.

A pitchfork having closely-spaced tines has been used to remove urine-soaked wood shavings and manure that are concentrated in a particular area of a horse stall. The manual separation of droppings from the wood shavings with a pitchfork is tedious and time-consuming work. Typically, during stall cleaning, some of the wood shavings are removed from the stalls with the droppings. The removed wood shavings and manure are then discarded. However, a portion of the wood shavings that are removed includes unsoiled wood shavings that could be reused if the unsoiled shavings were separated from the droppings. The expense of replacing wood shavings in a stall is be reduced if the unsoiled shavings are reused rather than discarded. Additionally, waste is reduced by reusing the unsoiled shavings rather than discarding the unsoiled shavings.

Devices exist that utilize vibratory screening devices to separate unsoiled wood shavings from stalls. One such device is shown in U.S. Pat. No. 5,927,513 to Hart, which uses a shaker frame that is inclined suspended on springs carried on a carriage. The Hart device requires a user to manually deposit wood chips and manure onto the shaker frame of the apparatus. Additionally, a user is required to position a container at one end of the shaker frame of the device to catch soiled wood shavings and manure for disposal.

SUMMARY OF THE INVENTION

An apparatus for collecting and sifting material includes a stationary portion and a vibrating portion. The stationary portion includes a support, such as a pair of wheels, that support a frame. A scoop is located at a front end of the frame. Upwardly extending sidewalls are provided on each side of the scoop and frame to contain materials thereon. A handle is provided on a rear end of the frame. A receptacle is located behind the frame on the apparatus and is positioned such that materials may slide off of the rear end of the frame into the receptacle. A support cable is affixed to the handle and to the receptacle to support the receptacle. A power supply is supported by the handles. The vibrating portion of the apparatus includes a tray that is supported by the frame. The tray has a rigid perimeter that surrounds and supports a plurality of spaced elements, such as tray cables. Elastomeric grommets are located at corners of the tray between the tray and the frame support the tray on the frame. A motor is mounted on the tray. The motor rotates an off-center weight to impart vibration to the tray. The motor is operably connected to the power supply to receive power from the power supply.

In use, an operator forces the scoop under material, such as wood chips and manure, to direct the material onto the scoop and tray. Once a desired amount of material is collected, the operator pushes down on the handle to pivot the frame about the wheels to level the apparatus. The motor is activated to impart vibration to the tray. The operator may then selectively angle the frame by pivoting the frame about the wheels so that the material slides onto the spaced tray cables within the tray. Typically, the wood chips will vibrate through the spaced tray cables, while larger pieces of manure will remain upon the tray. The operator may then further the depress handles, thereby raising the front end of the frame so that any material remaining upon the spaced tray cables of the tray will vibrate towards the rear end of the frame and will fall into the receptacle.

DETAILED DESCRIPTION OF THE INVENTION

Figure 1:
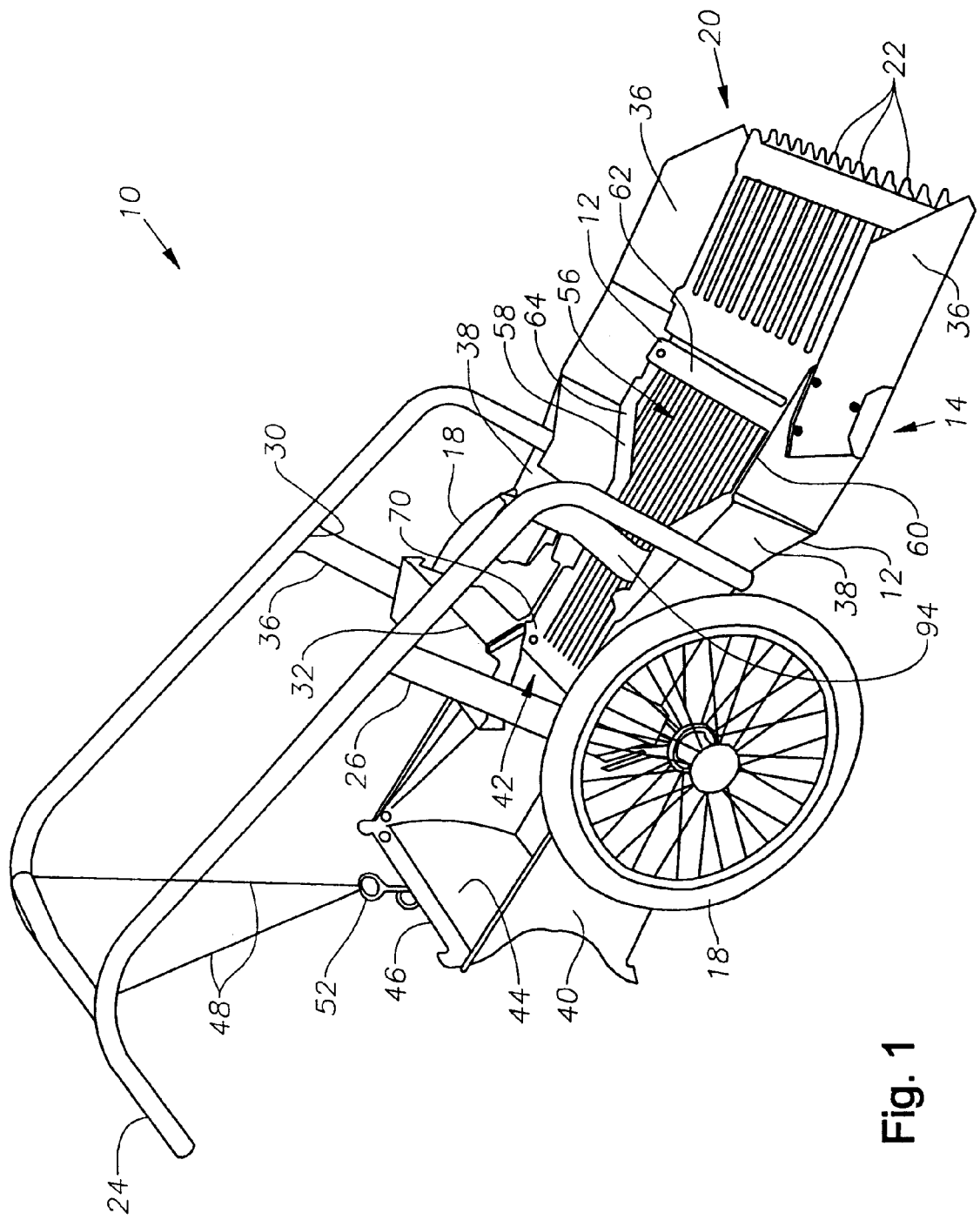
FIG. 1 is a perspective view of the apparatus of the invention.
Figure 2:
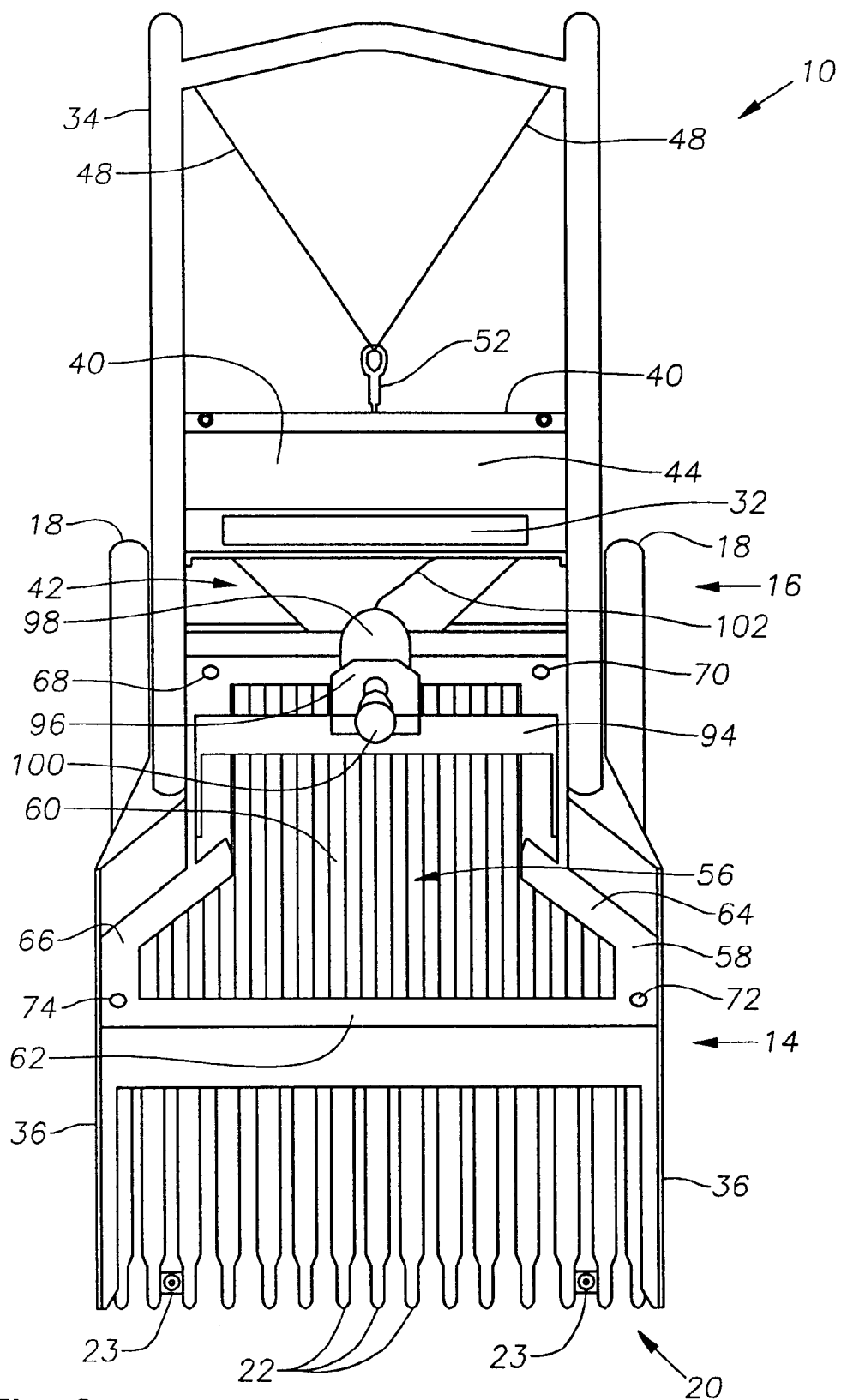
FIG. 2 is a top view of the apparatus shown in FIG. 1.
Figure 3:
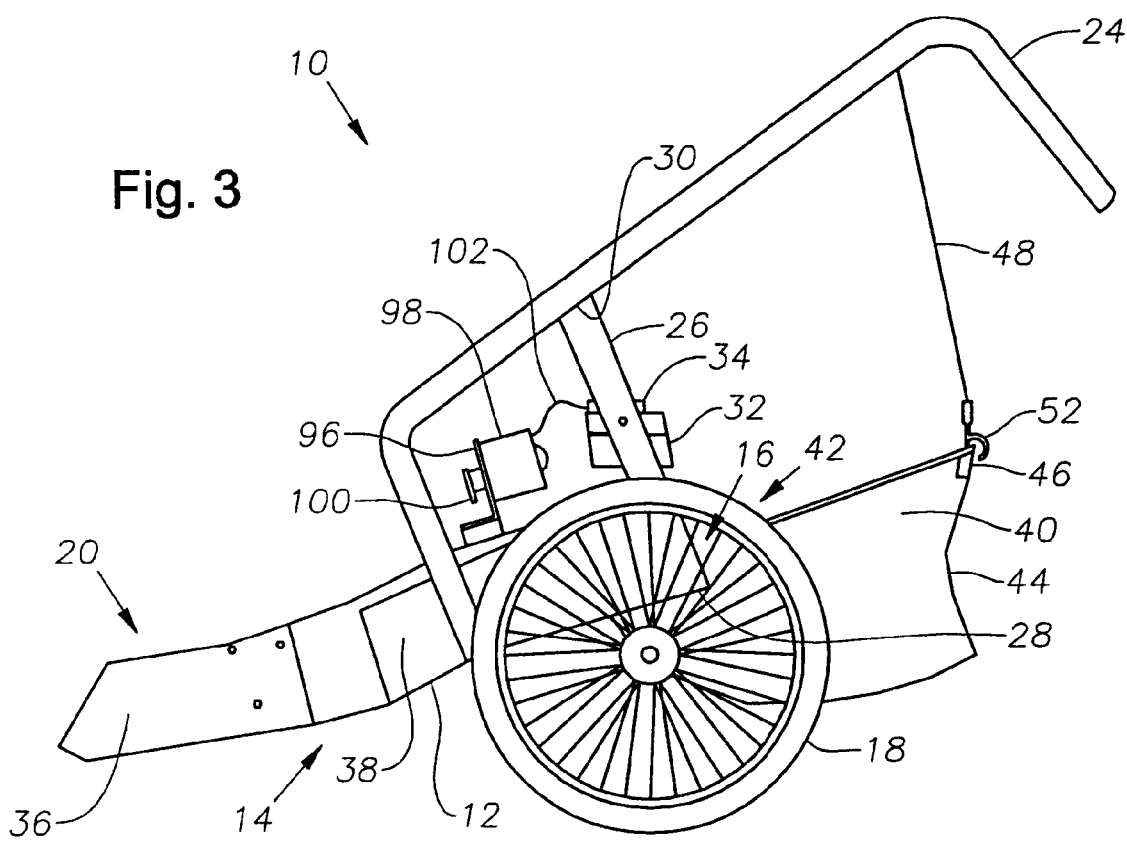
FIG. 3 is a side view of the apparatus shown in FIG. 1.
Figure 4:
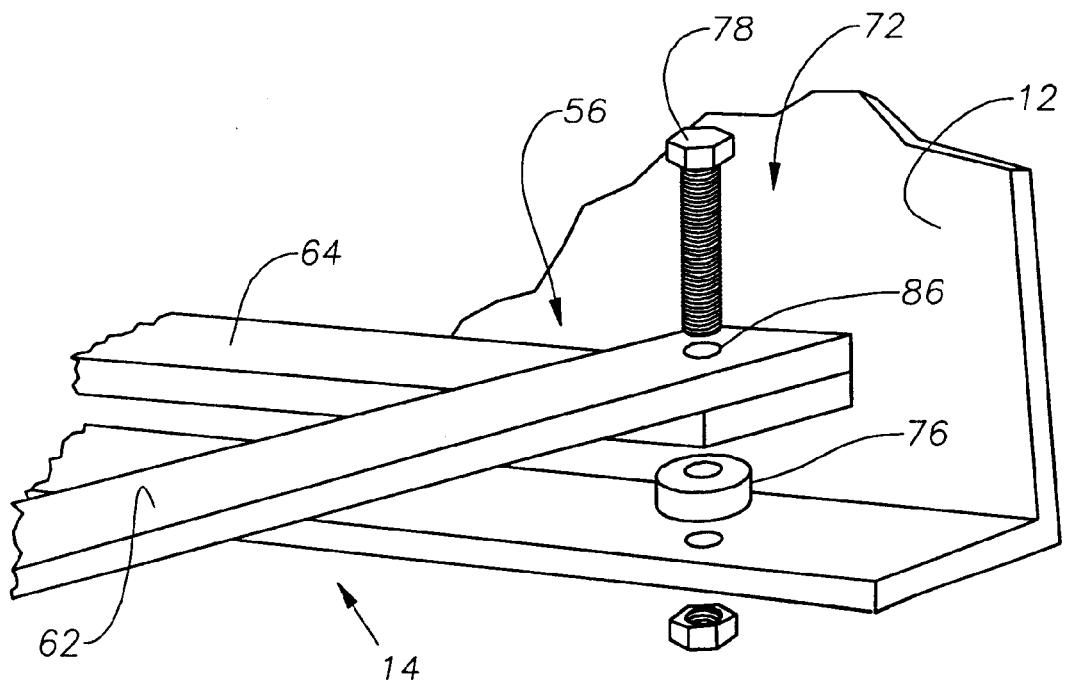
FIG. 4 is an enlarged perspective view of a corner of the tray supported by an elastomeric mount on the frame of the apparatus shown in FIG. 1.

Referring now to FIGS. 1–4, an apparatus for collecting and sifting materials is designated generally 10. Apparatus 10 has a frame 12. Frame 12 has a front end 14 and a rear end 16. The frame 12 is preferably comprised of L-channel (FIG. 4). The frame 12 is supported by supports, such as wheels 18. A scoop 20 is mounted on front end 14 of frame 12. Scoop 20 is preferably made up of a plurality of forwardly extending tines 22 (FIGS. 1 and 2). Alternatively, a flat plate (not shown) may be provided in scoop 20. It has been found that the flat plate works better when collecting material that is located on a concrete floor. Preferably, rollers 23, such as 1½ inch bearings, are added to tines 22 to improve sliding of the scoop 20 over a surface.

A handle 24 is affixed to frame 12. A pair of vertical braces 26 are affixed at a lower end 28 to frame 12 and are affixed at an upper end 30 to handle 24. A pivotally mounted battery box 32, is mounted between the pair of vertical braces 26 for carrying a battery 34 (FIG. 3). Battery box 32 is pivotally mounted to vertical braces 26 so that a power supply, such as battery 34, remains substantially vertical when an operator pivots the apparatus 10 about wheels 18 with handle 24. The preferred power supply or battery 34 is a 12 volt battery.

Upwardly extending side walls 36 are provided on each side of scoop 20 to retain material upon the scoop 20. Upwardly extending side walls 38 are also provided on the sides of frame 12. Upwardly extending side walls 38 communicate with side walls 36 so that material gathered on scoop 20 may be delivered rearward of scoop 20 without losing material over the sides.

A receptacle, such as bag 40, is mounted behind frame 12. The bag 40 has a front side 42 that is in communication with a rear portion 16 of frame 12. Bag 40 has a rear side 44 with a rear brace 46 mounted thereon. A support cable 48 is affixed to handle 24. A hook 52 is affixed to cable 48 for engaging rear brace 46 and supporting bag 40. A tray 56 is supported by frame 12. Tray 56 has a rigid perimeter 58 that supports and surrounds a plurality of spaced elements, such as tray cables 60. Other spaced elements may be used including spaced rods or other suitable elements. Tray cables 60 are preferably made of twine and are placed at ¾" centers across the width of tray 56. Tray 56 is located rearward of scoop 20. Tray 56 is open at the bottom, with cables 60 forming a screen to prevent large objects from falling through. The rigid perimeter 58 has a front tray piece 62, a left side tray piece 64 and a right side tray piece 66.

Rigid perimeter 58 has four corners 68, 70, 72 and 74. A support, such as elastomeric mount 76 (FIG. 4), is positioned at each of four corners 68, 70, 72 and 74 between tray 56 and frame 12 for supporting tray 56 on frame 12 and for dampening the transfer of vibration from tray 56 to frame 12. Preferably, a bolt 78 (FIG. 4) passes through respective holes 86 (FIG. 4) in each of the respective corners 68, 70, 72 and 74 of tray 56. The bolts pass through the respective elastomeric mounts 76 and into a corresponding hole in tray 56 (see FIG. 4). A tray mounted motor support 94 is affixed between left side tray piece 64 and right side tray piece 66. Tray mounted motor support 94 is a brace that extends upwards and spans across a width of tray 56. A motor bracket 96 (FIGS. 2 and 3) is mounted centrally on tray mounted motor support 94 above tray 56. Motor 98 (FIGS. 2 and 3) is affixed to motor bracket 96. Preferably, motor 98 is a 12 volt 2350 RPM Dayton model no. 2M197 electric motor, although other types of motors may be used. Affixed to motor 98 is an eccentric weight 100 (FIGS. 2 and 3). The rotation of eccentric weight 100 by motor 98 imparts vibration to tray 56 via tray mounted motor support 94. The vibration of tray 56 is isolated from frame 12 and handle 24 by elastomeric mounts 76. A motor wire 102 FIGS. 2 and 3) connects motor 98 with battery 34 for delivering power to motor 98.

In practice, the apparatus for collecting and sifting materials 10 may be used for applications such as cleaning stalls that house horses. In use, an operator pushes apparatus 10 into the stall and forces tines 22 on the front end of 14 of scoop 20 under the stall material. Preferably, tines 22 on scoop 20 ride on rollers 23. Typically, stall material includes wood chips and manure. Once a desired amount of wood chips and manure are collected within scoop 20, the operator pushes down on handle 24 to level frame 12. Motor 98 is activated to rotate eccentric weight 100, which imparts vibration to tray 56. The operator may then selectively angle frame 12 by pivoting frame 12 about wheels 18 so that material slides onto the spaced tray cables 60 within tray 56. It has been found that a more complete sifting of material takes place if frame 12 is maintained in a level position for a period of time since the material will remain upon the vibrating spaced tray cables 60 of tray 56 while frame 12 is maintained in the level position. Typically, the wood chips will vibrate through spaced tray cables 60 and fall back onto the floor of the stall, while the larger pieces of manure will remain upon the cables 60 of tray 56. The operator may then further depress handles 24, thereby raising front end 14 of frame 12 so that material remaining upon the spaced tray cables 60 of tray 56 will slide towards rear end 16 of frame 12 and fall into bag 40.

The invention has numerous advantages. By using the apparatus of the invention, labor time to clean stalls is greatly reduced. Additionally, by separating the shavings from manure, shavings may be reused. Further, only the manure is removed from the stall material and the wood chips to fall through the spaced tray cables for re-use. Therefore, the volume of refuse may be reduced.

While the invention has been shown in only one of its forms, it should be apparent to those skilled in the art that it is not so limited, but is susceptible to various changes without departing from the scope of the invention.

What is claimed is:

1. An apparatus for collecting and sifting material comprising:

a frame mounted on a pair of wheels, said frame being manually tiltable about an axis of rotation of said wheels;

a scoop mounted on said front end of said frame for scooping up material for sifting;

a tray supported by said frame, said tray having a plurality of spaced elements for receiving material that is scooped up by the scoop;

a motor for imparting vibration to said tray, causing smaller pieces of the material to fall through the spaced elements;

wherein larger pieces of material remaining on said spaced elements slide rearward from said spaced elements for collection when the frame is tilted rearwardly about said axis of rotation of said wheels; and a handle mounted stationarily to the frame and extending rearwardly therefrom past the wheels so that pushing downward on said handle tilts the frame rearwardly about said axis of rotation of said wheels.

2. The apparatus according to claim 1 wherein:

said scoop is stationarily mounted to said frame, and said frame is tiltable forwardly relative to said wheels to position said scoop in position for scooping by moving said scoop forwardly.

3. The apparatus according to claim 1 wherein:

said scoop has a plurality of forwardly extending tines for scooping material by pushing said frame forwardly.

4. The apparatus according to claim 1 further comprising:

a roller that extends below said scoop for contact with a floor surface to aid in sliding of said scoop over a floor surface when said frame is pushed forwardly.

5. The apparatus according to claim 1 further comprising:

upwardly extending side walls on a right side and a left side of said scoop for containing material on said scoop; and upwardly extending side walls on a right side and a left side of said tray for containing material on said tray.

6. The apparatus according to claim 1 further comprising:

a receptacle mounted to a rear end of said frame rearward of said spaced elements for collecting said larger pieces of material.

7. The apparatus according to claim 1 further comprising:

a dampening member between said tray and said frame to dampen a transmission of vibration from said tray to said frame.

8. The apparatus according to claim 1 further comprising:

an elastomeric grommet at each corner of said tray and located between said tray and said frame to dampen a transmission of vibration from said tray to said frame.

9. The apparatus according to claim 1 wherein:

said motor rotates an off-center weight to impart vibration to said tray.

10. An apparatus for collecting and sifting material comprising:

a frame;

upwardly extending side walls on a right side and a left side of said frame for containing material on said frame;

a pair of wheels for supporting said frame and allowing said frame to be manually tilted forwardly and rearwardly about a pivot point coinciding with an axis of rotation of said wheels;

a scoop mounted on a front end of said frame forward of said wheels for engaging a floor surface when said frame is tilted forwardly;

a tray supported by said frame, rearward of said scoop said tray having a plurality of spaced elements for receiving material collected by said scoop when said frame is tilted from a forwardly tilted position to a level position;

a receptacle carried by said frame, rearward of said spaced elements of said tray, wherein tilting said frame rearwardly from said level position causes said larger pieces of material to slide from said spaced elements into said receptacle;

a motor for rotating an off-center weight to impart vibration to said tray, causing smaller pieces of material to fall through said spaced elements onto said floor surface, while larger pieces of said material remain on said spaced elements; and a handle that extends rearwardly from said frame rearward of said wheels for manually moving said frame on said wheels and for tilting said frame by pushing downward on said handle to tilt said frame rearwardly and pulling upward on said handle to tilt said frame forwardly.

11. The apparatus according to claim 10 wherein:

said scoop has a plurality of forwardly extending tines for scooping material.

12. The apparatus according to claim 10 further comprising:

a roller that extends below said scoop for contact with said floor surface to aid in sliding of said scoop over said surface.

13. The apparatus according to claim 10 further comprising:

a dampening member between said tray and said frame to dampen a transmission of vibration from said tray to said frame.

14. The apparatus according to claim 10 further comprising:

an elastomeric grommet at each corner of said tray and located between said tray and said frame to dampen a transmission of vibration from said tray to said frame.

15. An apparatus for collecting and sifting material comprising:

a frame;

upwardly extending side walls on a right side and a left side of said frame for containing material on said frame;

a pair of wheels for supporting said frame and allowing said frame to be tilted forwardly and rearwardly about said wheels;

a scoop mounted on a front end of said frame for engaging a floor surface when said frame is tilted forwardly;

a tray supported by said frame, rearward of said scoop said tray having a plurality of spaced elements for receiving material collected by said scoop when said frame is tilted from a forwardly tilted position to a level position;

a receptacle carried by said frame, rearward of said tray, wherein tilting said frame rearwardly from said level position causes said larger pieces of material to slide from said spaced elements into said receptacle;

a motor for rotating an off-center weight to impart vibration to said tray, causing smaller pieces of material to fall through said spaced elements onto said floor surface, while larger pieces of said material remain on said spaced elements;

a handle that extends rearwardly from said frame for moving said frame on said wheels and for tilting said frame; and a support cable affixed to said handle and engaging a rear side of said receptacle.

16. A method for collecting and sifting material comprising the steps of:

(a) pivotally supporting a frame on a pair of wheels;

(b) mounting a scoop to a forward end of said frame;

(c) positioning a tray on said frame, rearward of said scoop, said tray having a plurality of spaced elements;

(d) manually tilting the frame forwardly about an axis of rotation of said wheels to lower said scoop and manually pushing said frame forward to scoop up the material;

(e) manually tilting said frame rearwardly about said axis of rotation of said wheels from said forward position to cause said material to slide onto said tray;

(f) vibrating said tray on said frame, causing smaller particles of said material to fall through said spaced elements; and (g) transferring larger particles remaining on said spaced elements into a receptacle located adjacent said tray.

17. The method according to claim 16 wherein step (e) comprises tilting said frame to a substantially level position.

18. The method according to claim 17 wherein step (g) comprises:

tilting said frame rearwardly.

19. The method according to claim 16 wherein step (g) comprises:

tilting said frame rearwardly.

* * * * *